April 21, 1931. F. E. MAGUIRE 1,801,675
FRUIT PICKER
Filed Oct. 28, 1929
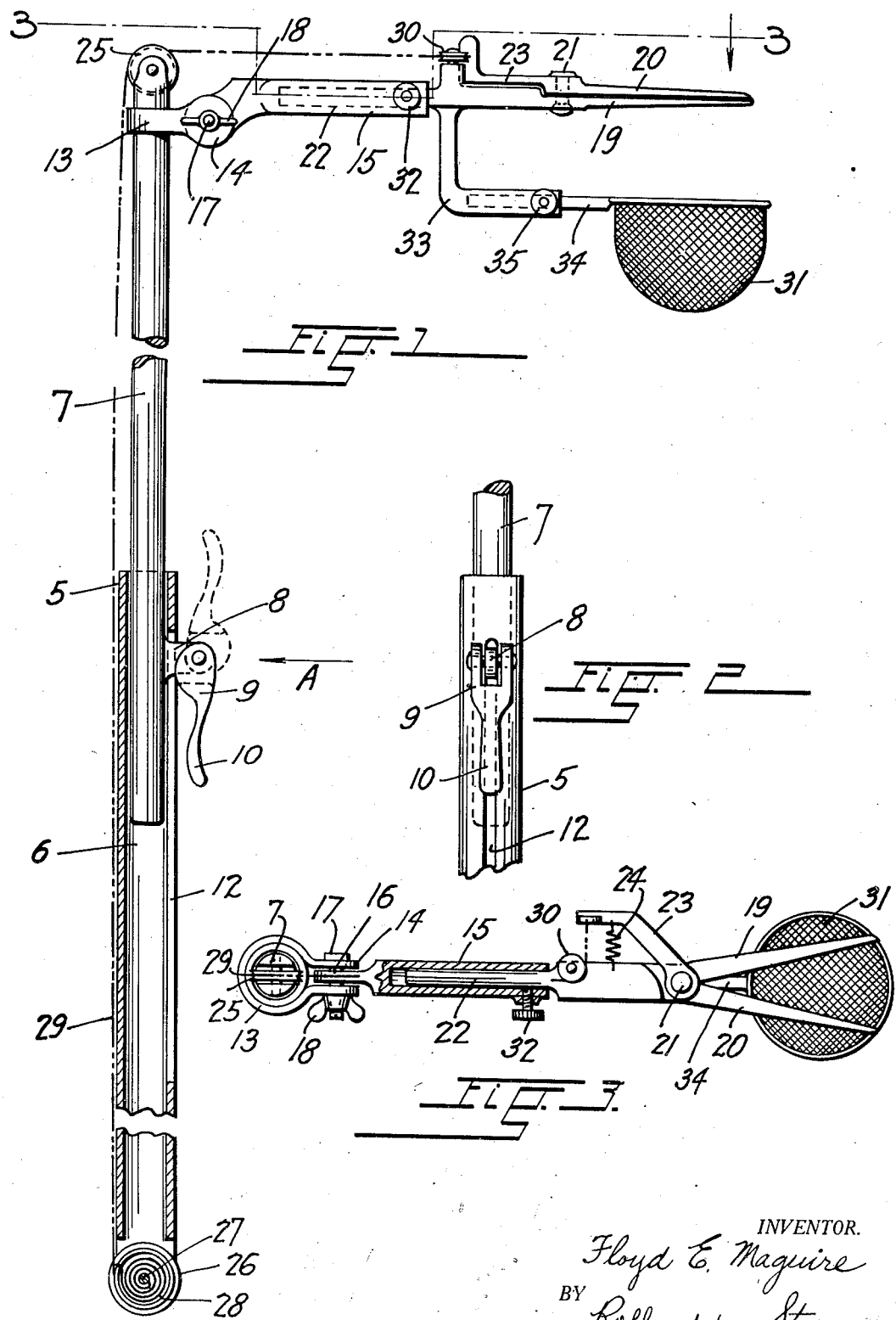
INVENTOR.
Floyd E. Maguire
BY Rollander & Stratton
ATTORNEYS.

Patented Apr. 21, 1931

1,801,675

UNITED STATES PATENT OFFICE

FLOYD E. MAGUIRE, OF SHARON SPRINGS, KANSAS, ASSIGNOR TO CARRIE A. MAGUIRE, OF CHEYENNE WELLS, COLORADO

FRUIT PICKER

Application filed October 28, 1929. Serial No. 403,019.

This invention relates to a fruit picking implement and its primary object is to provide a simple and readily adjustable device for picking fruit from trees at elevations that can not be reached by hand.

An embodiment of the invention has been shown in the accompanying drawings in which like parts are correspondingly designated and in which, Figure 1 is a sectional elevation of the fruit picker, Figure 2, a fragmentary face view of the telescoping rod of the device showing the clamping member whereby the sections of the rod are locked against relative motion, looking in the direction of the arrow A in Figure 1, and Figure 3, a sectional plan view along the line 3—3, Figure 1.

Referring further to the drawings, the fruit picker consists of a rod or pole 5 composed of telescoping sections 6 and 7.

The inner section 7 has at its lower end a lug 8 for the pivotal connection of a bifurcated cam member 9 which by engagement with the surface of the outer hollow section, locks the two sections against relative displacement.

The cam member has a handle 10 for ready manipulation and the hollow section 6 of the rod has a longitudinal slot 12 for the passage of the lug on the inner section.

Adjacent the upper end of the inner section of the pole is a laterally projecting arm for the support of the cutting element of the device, and for the support of a basket or other receptacle to catch the fruit that is separated from the branches of a tree by the cutting element.

The arm proper comprises a bracket 13 which partially encircles the inner section 7. The bracket has spaced and apertured end portions 14 for the pivotal support of a tubular holder 15. The holder has a head 16 between the extremities of the bracket, provided with a central aperture.

A bolt 17 passes through the apertures of the bracket and the head of the holder, and a thumb nut 18 on the threaded extremity of the bolt, serves to clamp the holder in its adjusted positions.

The cuttting element comprises a shears, the cutting blades 19 and 20 of which are pivotally connected as at 21.

One of the blades 19 has a shank 22 inserted in the tubular holder 15 and the other blade has a lever arm 23 to effect its operative movement with relation to the other blade.

A set screw 32 extending through a threaded aperture of the tubular holder 15, engages the shank of the fixed blade of the shears to fasten it in its adjusted positions.

A coiled spring 24 holds the two blades in their normal closed position.

The inner section of the telescoping rod has at its upper end a bearing for the rotary support of a sheave 25 and the outer section of the rod has at its lower end, a bearing for the rotary support of a spring reel 26.

The reel may consist of a hollow pulley rotatably mounted upon a relatively fixed spindle 27, and a coiled spring 28, one end of which is fastened to the spindle and the other end of which is secured at the periphery of the pulley.

A cord 29 wound around the pulley passes over the sheave 25 for its connection with the lever arm 23 of the movable blade 20 of the shears and a second sheave 30 supported on the shank of the stationary blade cooperates with the first mentioned sheave to guide the cord in effecting the pivotal movement of the blade with which it is connected.

A basket 31 or other suitable receptacle is disposed beneath the shears to catch the fruit that is severed from the branches of a tree. The basket is to this end connected with the stationary blade of the shears, the shank of which has been provided with an angular bracket 33.

The outer leg of the bracket is tubular and the basket has a handle 34 that projects loosely into the hollow leg. A set screw 35 in a threaded aperture of the leg fastens the arm in its adjusted positions.

In the operation of the implement, the telescoping rod is lengthened or shortened according to the elevation of the fruit to be picked. The inner section of the rod is to this purpose slid in one direction or another inside the outer hollow section, and it is locked in any desired position by pressure of the thumb upon the cam handle 10.

It will be understood that during movement of the inner section of the rod, the spring reel 26 maintains the cord in a taut condition.

The position of the shears relative to the pole may be varied by sliding the shank of the fixed blade of the shears, in the holder 15 and fastening it by means of the set screw 32, and the position of the basket may likewise be changed by sliding its handle, normally secured by the set screw 35, inside the hollow leg of the bracket 33.

The position of the cutting element may further be varied by moving the holder 15 about its pivot on the bracket 13, and the position of the latter on the pole, may be adjusted by sliding it upwardly or downwardly, it being understood that the nut and bolt may function to fasten both the bracket and the holder.

When it is desired to pick the fruit, the pivoted blade of the shears is separated from the fixed blade of the same by a pull on the cord 29. The opened blades are moved to straddle the stem of the fruit after which the cord is released.

The spring causes the movable blade to close upon the stationary blade, thereby severing the fruit from the branch. The fruit falls in the basket which is easily detached from the implement, to be emptied.

It is to be understood that the spring of the cutting element may be arranged to normally hold the blades of the shears in the open position in which case the cord is pulled to close the blades together, and that other variations in the construction and arrangement of the parts of the implement may be resorted to without departing from the scope and spirit of the invention.

What I claim and desire to secure by Letters Patent is:

1. A fruit picker comprising a pole, an arm at an end thereof, shears having a blade fixed on the arm and a relatively movable blade, a spring acting upon the movable blade, a spring reel on the pole, and a cord on the spring reel, operatively connected with the movable blade.

2. A fruit picker comprising a pole, an arm at an end thereof, shears having a blade fixed on the arm and a relatively movable blade, a spring acting upon the movable blade, a spring reel at the lower portion of the pole, a sheave at the upper portion of the same, and a cord on the spring reel, guided by the sheave and operatively connected with the movable blade.

3. A fruit picker comprising a pole, shears at the upper end thereof, including a fixed blade and a relatively movable blade, means for actuation of the movable blade from the lower portion of the pole, a tubular bracket on the fixed blade, a basket beneath the shears, having a handle slidable in the bracket, and means to secure the basket in adjusted positions.

4. A fruit picker comprising a pole, a tubular holder at the upper end thereof, a cutting element comprising a blade slidable in the holder, a relatively movable blade, and means for fixing the first blade in the holder, and means for actuating the movable blade from the lower portion of the pole.

5. A fruit picker comprising a pole, a pivotally adjustable tubular holder at the upper end thereof, a cutting element comprising a blade slidable in the holder, a relatively movable blade, and means for fixing the first blade in the holder, and means for actuating the movable blade from the lower portion of the pole.

6. A fruit picker comprising a pole composed of telescoping sections, a cutting element at the upper end of the pole, a sheave adjacent the cutting element, a spring reel at the lower portion of the pole, and a cord on the spring reel, guided by the sheave and operatively connected with the cutting element.

7. A fruit picker comprising a pole composed of telescoping sections, a cutting element at the upper end of the pole, a sheave adjacent the cutting element, a tensioning device at the lower portion of the pole, and and a cord on the tensioning device, guided by the sheave and operatively connected with the cutting element.

In testimony whereof I have affixed my signature.

FLOYD E. MAGUIRE.